(12) United States Patent
Shimotsu

(10) Patent No.: US 7,692,876 B2
(45) Date of Patent: Apr. 6, 2010

(54) OPTICAL MODULE

(75) Inventor: Shinichi Shimotsu, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 796 days.

(21) Appl. No.: 11/513,042

(22) Filed: Aug. 31, 2006

(65) Prior Publication Data

US 2007/0046932 A1 Mar. 1, 2007

(30) Foreign Application Priority Data

Aug. 31, 2005 (JP) .............................. 2005-251596

(51) Int. Cl.
*G02B 1/00* (2006.01)

(52) U.S. Cl. ...................................... 359/723; 359/722

(58) Field of Classification Search ................ 359/722, 359/723; 372/101, 103, 108; 362/268, 311.01, 362/311.03, 311.05
See application file for complete search history.

(56) References Cited

U.S. PATENT DOCUMENTS 5,745,623 A * 4/1998 Ohtomo et al. ............... 385/88

FOREIGN PATENT DOCUMENTS

| JP | 4(1992)-091320 | 8/1992 |
| JP | 2004-253783 | 9/2004 |
| JP | 2004-294906 A | 10/2004 |

OTHER PUBLICATIONS

"Amorphous Silica Material Application Handbook", Realize-sha, 1999, p. 41.

* cited by examiner

*Primary Examiner*—Joseph Martinez
(74) *Attorney, Agent, or Firm*—Sughrue Mion, PLLC

(57) ABSTRACT

An optical module in which the light outputted from the light source is condensed before outputted, and yet capable of reducing the development of contaminants on the light condensing area. The optical module includes: a light source for outputting light in the short wavelength region; a transparent member having a light input face and a light output face; and a condensing optical system for inputting the light outputted from the light source to the input face of the transparent member, and focusing the light on the output face. The transparent member has an alkali metal content (e.g. Na or K) of less than 2.0% by weight, and/or with a light absorption of less than 0.65%/mm for the light outputted from the light source.

19 Claims, 4 Drawing Sheets

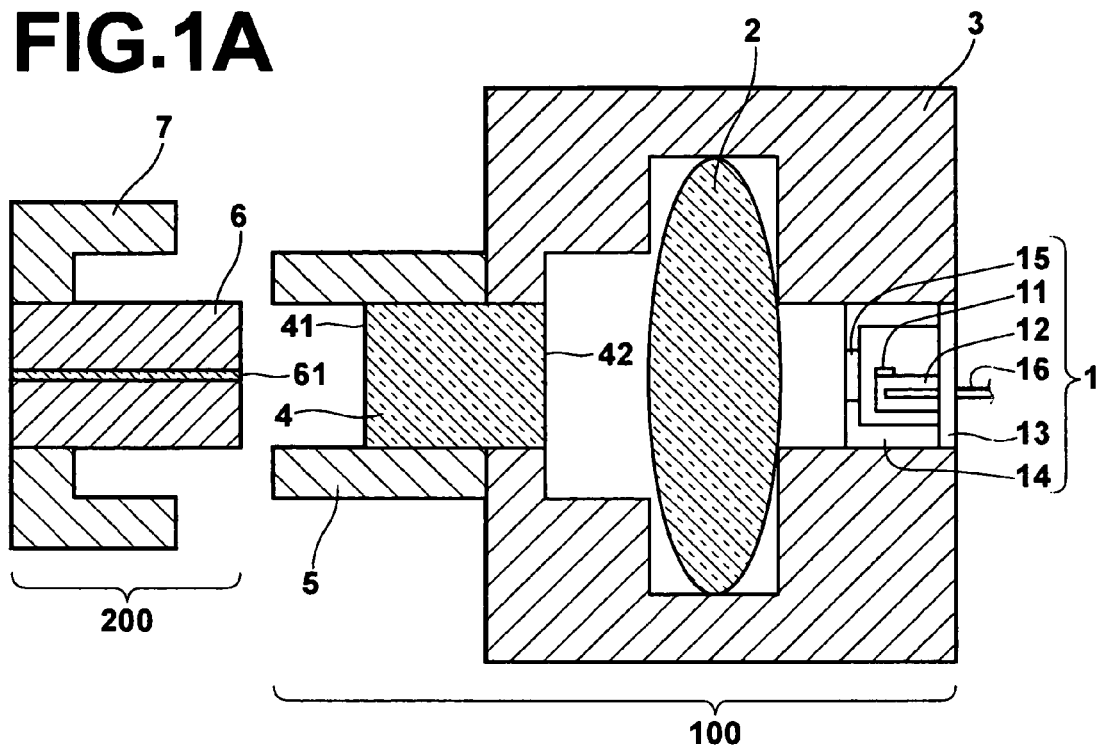
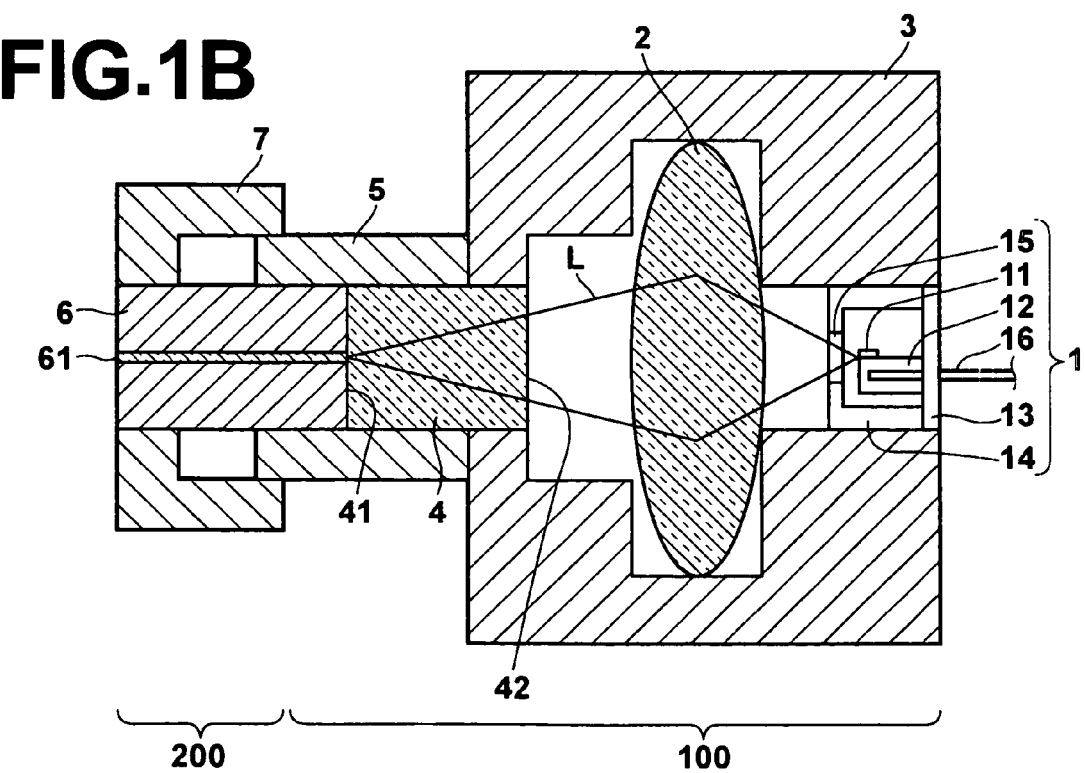

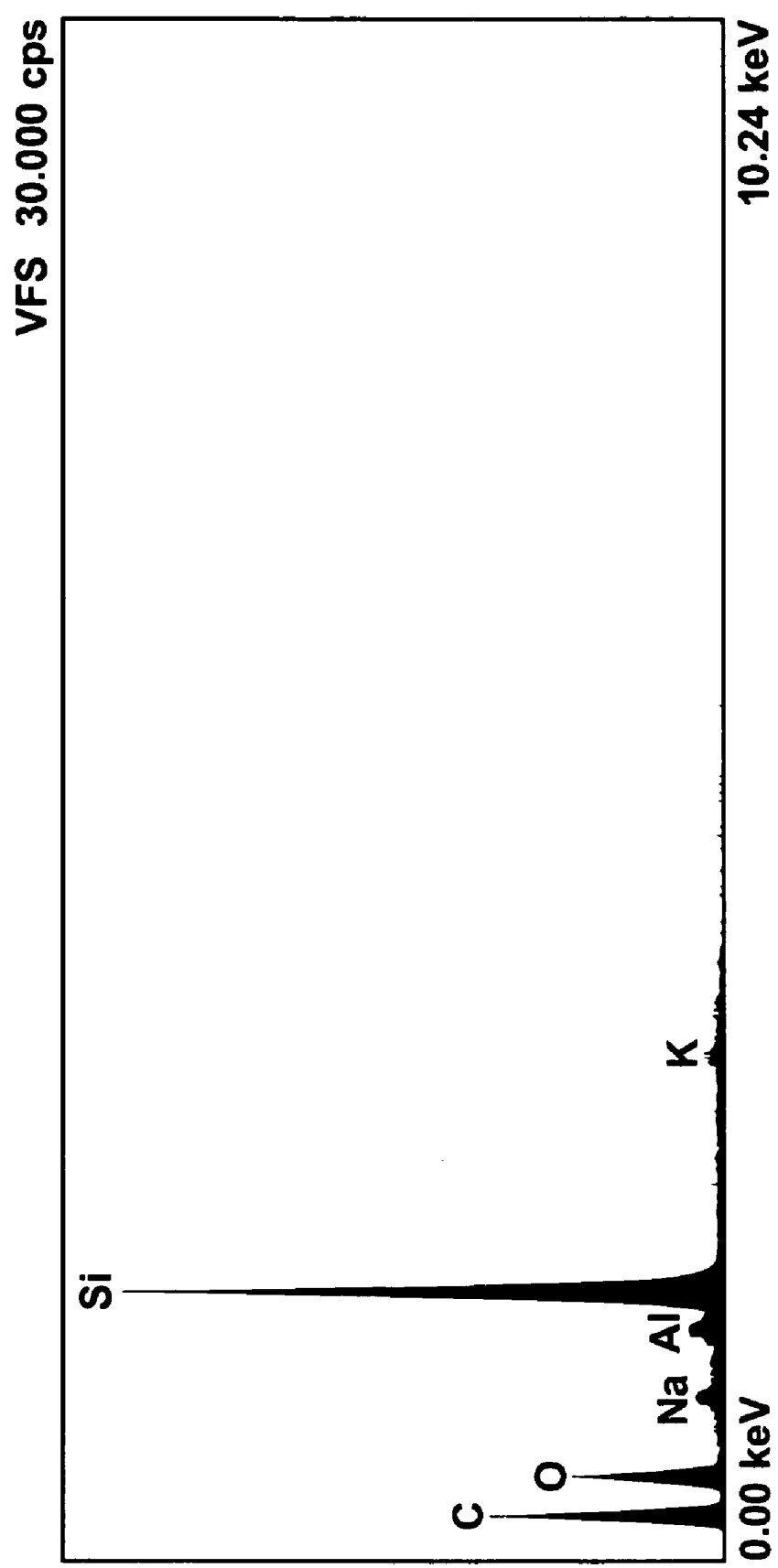

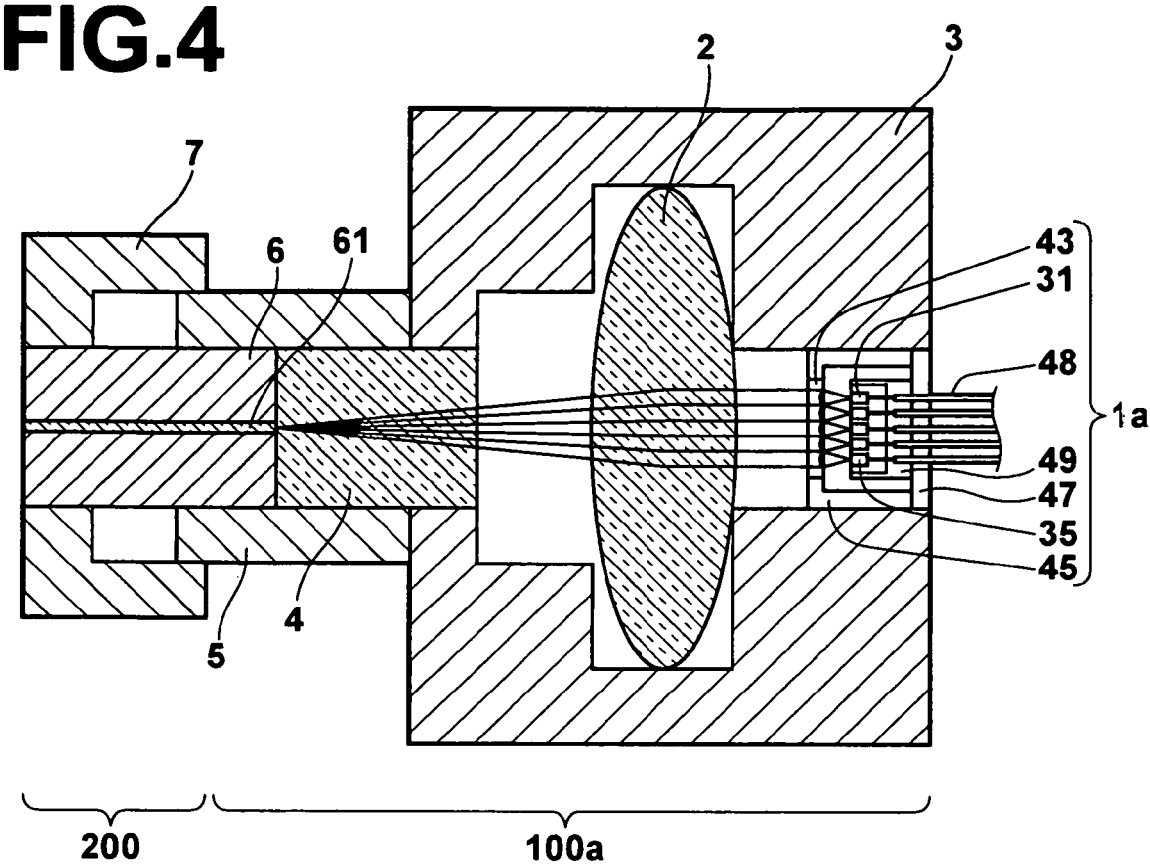

OPTICAL MODULE

BACKGROUND OF THE INVENTION

1. Field of the Invention

The present invention relates to a receptacle type optical module having a stub made of a transparent material.

2. Description of the Related Art

Optical modules that include a semiconductor laser and a condensing optical system for condensing laser light outputted from the semiconductor laser are generally known as an optical communication component. Among such modules, a receptacle type optical module detachably connected to an optical connector holding an optical fiber is also known as described, for example, in Japanese Unexamined Patent Publication No. 2004-294906. In such receptacle type module, a fiber stub is press fitted and fixed in the module to stably input laser light outputted from the semiconductor laser.

In the optical module having a fiber stub, however, the input face of the fiber stub where the laser light is condensed is exposed to the atmosphere, and the light condensing area has a high optical power density, so that organic substances (contaminants) developed by photochemical reactions are likely to be collected on the input face of the fiber stub. The contaminants adhered on the input face of the fiber stub deteriorate the laser properties, and the reliability of the optical module is degraded.

It is an object of the present invention, therefore, to provide an optical module having high reliability by preventing the development of such contaminants.

SUMMARY OF THE INVENTION

In order to solve the problem described above, the present invention provides an optical module comprising:

at least one light source for outputting light in the short wavelength region;

a transparent member having a light input face and a light output face; and a condensing optical system for inputting the light outputted from the light source to the input face of the transparent member, and focusing the light on the output face, wherein the transparent member has an alkali metal content of less than 2.0% by weight.

Another optical module of the present invention comprises:

at least one light source for outputting light in the short wavelength region;

a transparent member having a light input face and a light output face; and a condensing optical system for inputting the light outputted from the light source to the input face of the transparent member, and focusing the light on the output face, wherein the transparent member has Na and K contents of less than 2.0% by weight respectively.

Still another optical module of the present invention comprises:

at least one light source for outputting light in the short wavelength region;

a transparent member having a light input face and a light output face; and a condensing optical system for inputting the light outputted from the light source to the input face of the transparent member, and focusing the light on the output face, wherein the transparent member has a light absorption of less than 0.65%/mm for the light outputted from the light source.

The transparent member described above may be a transparent member having an alkali metal content of less than 2.0% by weight with a light absorption of less than 0.65%/mm for the light outputted from the light source.

Further, the transparent member described above may be a transparent member having Na and K contents of less than 2.0% by weight respectively with a light absorption of less than 0.65%/mm for the light outputted from the light source.

Still further, the transparent member has a uniform refractive index, unlike the fiber stub which includes therein an optical fiber (light guide) having an index difference.

Further, the transparent member may be made of quartz, glass (e.g., K-FK5, K-CaFK95, K-PFK80, K-VC79, K-PBK40, K-GFK68, K-PSK11, K-PSK200, K-PFK85, K-PG325, K-SK4, K-VC78, K-PBK50, K-GFK70, K-BK7, or the like available from Sumita Optical Glass Inc.), crystalline body (e.g., glass including not less than 50% of at least one material selected from the group consisting of $SiO_2$, $CaF_2$, and $MgF_2$), or the like, and transparent to the light outputted from the light source.

The oscillation wavelength of the light outputted from the light source is in the short wavelength range of 350 nm to 450 nm. Accordingly, the transparent member is a member that transmits (is transparent to) the light in the short wavelength range of 350 nm to 450 nm.

Preferably, the length of the transparent member in the optical axis directions is not less than 1 mm, and more preferably not less than 2 mm in view of a longer life of the transparent member.

Further, the transparent member may have an antireflection coating on the input face thereof. This may prevent the incident light reflected from the input face of the transparent member to be irradiated on the light source.

BRIEF DESCRIPTION OF THE DRAWINGS

FIGS. 1A, 1B are a schematic cross-sectional view of the optical module according to a first embodiment.

FIG. 2 is a graph illustrating an analysis result of chemical composition of a general glass stub.

FIG. 4 is a schematic cross-sectional view of the optical module according to a second embodiment.

DESCRIPTION OF THE PREFERRED EMBODIMENTS

Figure 3A:
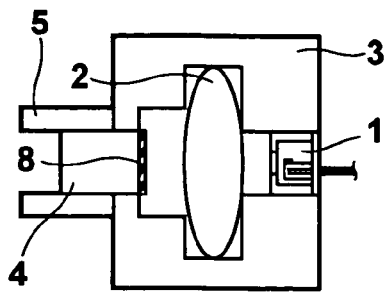
FIGS. 3A to 3G are drawings for explaining other examples of quartz stubs.

Hereinafter, embodiments of optical modules incorporating the present invention will be described. In the following embodiments, a quartz stub is used as an example of the transparent member. But, the transparent member may be made of glass (e.g., K-FK5, K-CaFK95, K-PFK80, K-VC79, K-PBK40, K-GFK68, K-PSK11, K-PSK200, K-PFK85, K-PG325, K-SK4, K-VC78, K-PBK50, K-GFK70, K-BK7, or the like available from Sumita optical Glass Inc.), crystalline body (e.g., glass including not less than 50% of at least one material selected from the group consisting of $SiO_2$, $CaF_2$, and $MgF_2$), or the like.

First Embodiment

FIGS. 1A, 1B are a cross-sectional view of an optical module 100 of the present embodiment, illustrating the schematic structure thereof.

The optical module 100 includes: a light source 1, a condenser lens 2, a lens holder 3, a quartz stub 4, a ferrule 5, and the like. A semiconductor laser 11 is mounted on a block 12 using a brazing metal such as AuSn, and the block 12 is fixed on a stem 13. The semiconductor laser 11 is air tightly sealed in a cap 14 by bonding the edge of the cap 14 having a light output window 15 to the stem 13 using YAG welding or other similar laser welding, soldering, adhesive, or the like in an inert gaseous atmosphere. A terminal 16 for electrically driving the semiconductor laser 11 is drawn outside through an aperture of the stem 13 (not shown). The cap 14 having the semiconductor laser 11 sealed therein is press fitted and fixed in the lens holder 3. Here, the semiconductor laser 11 is a semiconductor laser that outputs laser light in the short wavelength range of 350 nm to 450 nm, and a GaN system semiconductor laser or the like is used as an example.

The condenser lens 2 (condensing optical system) is fixed inside of the lens holder 3 by press fitting or bonding.

The output face 41 of the quartz stub (transparent member) 4 is inserted and held in the ferrule 5, and the input face 42 thereof is inserted in the lens holder 3, thereby the quartz stub 4 is connected and fixed to the lens holder 3. Detailed description of the transparent member will be provided later.

The condenser lens 2 is disposed at a place in the lens holder 3 such that condensed laser light L is inputted to the input face 42 of the quartz stub 4, and focused at the output face 41 thereof. For example, the lens holder 3 may be structured to allow the condenser lens 2 to move slidably in the optical axis directions of the optical module 100.

The optical connector 200 includes an optical fiber 61, a ferrule 6, and a connector 7. For example, a multimode optical fiber with a numerical aperture (NA) of around 0.22 is used as the optical fiber 61. The input end of the optical fiber 61 is inserted into the through hole of the ferrule 6, and the ferrule 6 is held by the connector 7. As shown in FIG. 1B, the ferrule 6 is inserted and fixed in the ferrule 5. Here, the input face of the optical fiber 61 and output face of the quartz stub 4 are brought into close contact with each other, and fixed without any gap between them, since such gap causes contaminants to be developed. The laser light L focused on the output face 41 of the quartz stub 4 enters into the optical fiber 61, propagates through the fiber, and exits from the output face thereof (not shown).

In the optical module 100 constructed in the manner as described above, high optical power density at the input face 42 of the quartz stub 4 causes organic substances to be developed thereon by photochemical reactions and contaminated. Preferably, therefore, the area of the input face 42 of the quartz stub 4 exposed by the laser light L is large. Preferably, for example, the length of the quartz stub 4 in the optical axis directions is not less than 1 mm when the NA of the optical fiber is 0.22, and more preferably not less than 2 mm in view of a longer life of the quartz stub 4.

Hereinafter the transparent member (quartz stub 4 in the present embodiment) will be described in detail. An optical module like that shown in FIGS. 1A, 1B was formed using a common glass stub to perform demonstrative operation. After laser light having a wavelength of 405 nm with an optical power of around 200 mW was inputted to the optical fiber for a prolonged period of time, certain contaminants were observed on the input face of the optical fiber. As such, a chemical composition analysis was conducted for the commonly used glass stub, and the result of the analysis is shown in FIG. 2. EDX analyzer (Energy Dispersive X-ray Spectrometry/EMAM-700 manufactured by Horiba Ltd.) was used for the analysis. As a prior treatment of the glass stub, the circumference of the stub and the outer metal are made electrically continuous by an electrically conductive coating material, and carbon vapor deposition was performed (around 2000 nm). The analysis conditions include: analysis area of approximately 50×40 (2000× area); measuring time of 100 sec; acceleration voltage of 15.0 kV; pulse processing time of P3; electron beam incident angle of 90.0 degrees; dead time of 5%; and X-ray take-off angle of 30.0 degrees. Standardless Φ (ρz) method was used as the quantitative correction method, and overlap factor method was used as the peak separation method. Table 1 quantitatively shows the composition of the quartz stub. In Table 1, the values of oxygen O are the amounts required for calculating oxides, and quantitative calculation therefore was not performed.

TABLE 1

| Element | Weight Density (%) | Atomicity Density (%) |
|---------|--------------------|-----------------------|
| Na      | 2.0                | 1.8                   |
| Al      | 1.5                | 1.1                   |
| Si      | 43                 | 31                    |
| K       | 1.3                | 65                    |
| O       | 52                 | 65                    |

As shown in Table 1, the glass stub has a Na content of 2.0% by weight and a K content of 1.3% by weight. That is, it might well be said that the contaminants on the input face of the optical fiber found in the demonstrative operation are the products of reactions of Na and K included in the glass stub with F (fluorine) included in the clad of the optical fiber. Preferably, therefore, the transparent member of the present embodiment has Na and K contents of less than 2.0% by weight respectively, in order to reduce the products of chemical reactions of Na and K with F.

Another optical module like that shown in FIGS. 1A, 1B was formed using a glass stub made of borosilicate glass, and demonstrative operation was conducted by emitting laser light having a wavelength of 400 nm from the light source for a prolonged period of time. As a result, it was learned that optical loss increases with time. It might well be said that the composition of the glass stub is changed, or microcrystals are deposited adjacent to the focusing position of the laser light through the prolonged irradiation of high power laser on the glass stub. As the result, the refractive index of the glass stub and the like are changed, thereby the optical loss is increased. The length of the borosilicate glass in the optical axis direction is 2 mm, and the light absorption for the 400 nm laser light is less than 0.65%/mm. Therefore, preferably, the light absorption of the transparent member of the present embodiment for laser light in the short wavelength range (350 nm to 450 nm) is less than 0.65%/mm.

That is, in the optical module 100 according to the present embodiment, a transparent material that has Na and K contents of less than 2.0% by weight, and/or with the light absorption of less than 0.65%/mm for the laser light in the short wavelength region (350 nm to 450 nm) is used as the transparent member. Further, an alkali metal content other than Na and K may also be less than 2.0% by weight. The transparent member transmits (is transparent to) light in the short wavelength range of 350 nm to 450 nm and has a substantially uniform refractive index, unlike the fiber stub which includes therein an optical fiber (light guide) having an index difference.

As described above, in the receptacle type optical module 100, the quartz stub 4 is disposed at the connecting section with the optical connector 200 such that the output face 41 of the quartz stub 4 is closely brought into contact with the input face of the optical fiber 61 without any gap between them, and the laser light is focused on the output face of the quartz stub 4 by the condenser lens 2. This arrangement may reduce the contaminants on the input face of the optical fiber 61, since the focusing position of the laser light is not exposed to the atmosphere.

Further, in the conventional optical module using the fiber stub, the laser light is focused on the optical fiber running through the fiber stub, and the focusing position is exposed to the atmosphere. This has forced extra time in the cleaning process when assembling the optical module. In the optical module 100 of the present invention, the focusing position of the laser light is not exposed to the atmosphere, so the cleaning process may be simplified.

Still further, the use of the transparent member that has Na and K (alkali metals) contents of less than 2.0% by weight allows development of products (contaminants) of chemical reactions of Na and K included in the transparent member with F included in the clad of the optical fiber to be reduced. Further, the use of the transparent member with a light absorption of less than 0.65%/mm may avoid property changes in the transparent member due to prolonged exposure to the laser light, thereby increase in the optical loss may be prevented.

Hereinafter, other examples of the quartz stubs of the optical module 100 will be described. FIG. 3A shows an optical module with the quartz stub 4 shown in FIGS. 1A, 1B having an antireflection coating 8 applied on the input face 42 thereof. A portion of the laser beam irradiated on the input face 42 of the quartz stub 4 is reflected by the input face 42. If the reflected light enters into the light source 1 through the light output window 15 and irradiates the semiconductor laser 11, the semiconductor laser 11 may be damaged and laser light outputted therefrom may become unstable. Application of the antireflection coating 8 on the input face 42 of the quartz stub 4 may reduce the amount of light reflected by the input face 42 and increase the transmittance of the quartz stub 4. The antireflection coating 8 may only be applied on a part of the input face 42 which is sufficient to cover the region where the laser beam is irradiated.

Figure 3B:
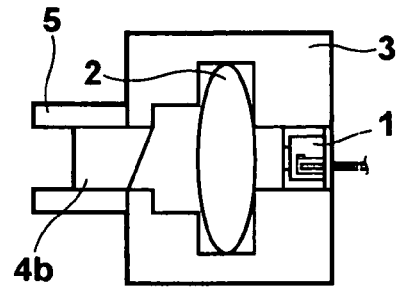
Figure 3C:
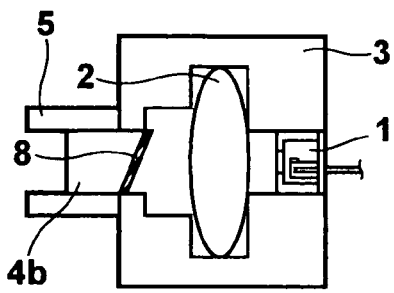

As shown in FIG. 3B, a quartz stub 4b having an angled input face with respect to the optical axis of the optical module may be used as the quartz stub 4. The use of the quartz stub 4b with the angled input face may prevent the light source 1 to be directly irradiated by the reflected light reflected from the input face of the quartz stub 4b. Further, the antireflection coating 8 may be applied on the region of the input face of the quartz stub 4b where the laser beam is irradiated, as shown in FIG. 3C.

Figure 3D:
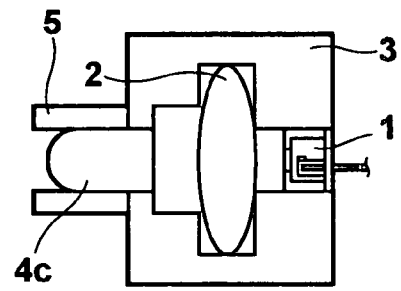
Figure 3E:
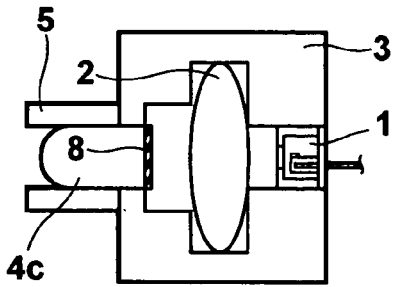

Further, as shown in FIG. 3D, a quartz stub 4C having a hemispherical output face may be used as the quartz stub 4. The use of the quartz stub 4C having the hemispherical output face allows the output face of the quartz stub 4C to be securely abutted to the input face of the optical fiber 61. Further, the antireflection coating 8 may be applied on the region of the input face of the quartz stub 4C where the laser beam is irradiated, as shown in FIG. 3E.

Figure 3F:
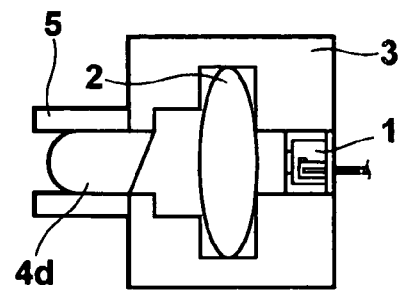
Figure 3G:
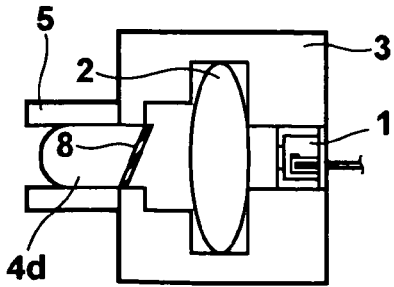

Still further, as shown in FIG. 3F, a quartz stub 4d having an angled input face with respect to optical axis of the optical module, and a hemispherical output face may be used as the quartz stub 4. Further, the antireflection coating 8 may be applied on the region of the input face of the quartz stub 4d where the laser beam is irradiated, as shown in FIG. 3G.

Second Embodiment

In the first embodiment, the optical module 100 having a single semiconductor laser 11 in the light source 1 has been described. In the second embodiment, an optical module 100a having a plurality of semiconductor lasers (e.g. five lasers) will be described.

FIG. 4 is a cross-sectional view of the optical module 100a and optical connector 200 illustrating the schematic structure thereof. The optical module 100a includes five semiconductor lasers 31 to 35 (e.g. GaN system semiconductor lasers) in a cap 45, and the light output window of the cap 45 is constituted by a collimator lens array 43. In FIG. 4, the shapes of the collimator lens array 43 and condenser lens 2 are schematically illustrated. Further, only the semiconductor lasers disposed at both ends are given the reference numerals 31 and 35 for clarity.

The semiconductor lasers 31 to 35 are mounted on a block 49 in the cap 45 using a brazing metal, such as AuSn, and air tightly sealed in the cap 45 by bonding the edge of the cap 45 to the stem 47 using YAG welding or other similar laser welding, soldering, adhesive, or the like in an inert gaseous atmosphere, as in the first embodiment. The cap 45 having the semiconductor lasers 31 to 35 sealed therein is press fitted and fixed in the lens holder 3. Terminals 48 for electrically driving the semiconductor lasers 31 to 35 are drawn outside through apertures of the stem 47.

The laser light emitted from each of the semiconductor lasers 31 to 35 in a diverging manner is collimated by the corresponding collimator lens of the collimator lens array 43. The collimated laser beams are condensed by the condenser lens 2 before entering into the quartz stub 4, and combined on the output face of the quartz stub 4. Then, the combined laser beam enters into the input face of the optical fiber 61, propagates through the fiber, and exits from the output face thereof (not shown).

In the optical module 100a of the present embodiment, a transparent material that has Na and K contents of less than 2.0% by weight, and/or with a light absorption of less than 0.65%/mm for the laser light in the short wavelength region (350 nm to 450 nm) is used as the transparent member. Further, an alkali metal content other than Na and K may also be less than 2.0% by weight. Still further, the transparent member is a transparent member having a substantially uniform refractive index, unlike the fiber stub which includes therein an optical fiber (light guide) having an index difference.

Further, the quartz stubs 4b to 4d shown in FIGS. 3B to 3G may be used as the quartz stub 4 of the present embodiment. Still further, an antireflection coating may be applied on the region of the input face of the quartz stub 4 where the laser beams are irradiated.

What is claimed is:

1. An optical module comprising:
    at least one light source for outputting light in the short wavelength region;
    a transparent member having a light input face and a light output face; and
    a condensing optical system for inputting the light outputted from the light source to the input face of the transparent member, and focusing the light on the output face,
    wherein the transparent member has an alkali metal content of less than 2.0% by weight, and
    wherein the transparent member is a glass member including at least one material selected from the group consisting of $SiO_2$, $CaF_2$, and $MgF_2$.

2. The optical module according to claim 1, wherein the transparent member has a uniform refractive index.

3. The optical module according to claim 1, wherein the oscillation wavelength of the light outputted from the light source is in the range of 350 nm to 450 nm.

4. The optical module according to claim 1, wherein the length of the transparent member in the optical axis directions is not less than 1 mm.

5. The optical module according to claim 1, wherein an antireflection coating is applied on the input face of the transparent member.

6. An optical module comprising:
   at least one light source for outputting light in the short wavelength region;
   a transparent member having a light input face and a light output face; and
   a condensing optical system for inputting the light outputted from the light source to the input face of the transparent member, and focusing the light on the output face,
      wherein the transparent member has Na and K contents of less than 2.0% by weight respectively.

7. The optical module according to claim 6, wherein the transparent member has a uniform refractive index.

8. The optical module according to claim 6, wherein the transparent member is a glass member including at least one material selected from the group consisting of $SiO_2$, $CaF_2$, and $MgF_2$.

9. The optical module according to claim 6, wherein the oscillation wavelength of the light outputted from the light source is in the range of 350 nm to 450 nm.

10. The optical module according to claim 6, wherein the length of the transparent member in the optical axis directions is not less than 1 mm.

11. The optical module according to claim 6, wherein an antireflection coating is applied on the input face of the transparent member.

12. An optical module comprising:
    at least one light source for outputting light in the short wavelength region;
    a transparent member having a light input face and a light output face; and
    a condensing optical system for inputting the light outputted from the light source to the input face of the transparent member, and focusing the light on the output face,
       wherein the transparent member has a light absorption of less than 0.65%/mm for the light outputted from the light source.

13. The optical module according to claim 12, wherein the transparent member has an alkali metal content of less than 2.0% by weight.

14. The optical module according to claim 12, wherein the transparent member has Na and K contents of less than 2.0% by weight respectively.

15. The optical module according to claim 12, wherein the transparent member has a uniform refractive index.

16. The optical module according to claim 12, wherein the transparent member is a glass member including at least one material selected from the group consisting of $SiO_2$, $CaF_2$, and $MgF_2$.

17. The optical module according to claim 12, wherein the oscillation wavelength of the light outputted from the light source is in the range of 350 nm to 450 nm.

18. The optical module according to claim 12, wherein the length of the transparent member in the optical axis directions is not less than 1 mm.

19. The optical module according to claim 12, wherein an antireflection coating is applied on the input face of the transparent member.

* * * * *